United States Patent
Kondalsamy et al.

(10) Patent No.: US 9,489,274 B2
(45) Date of Patent: Nov. 8, 2016

(54) SYSTEM AND METHOD FOR PERFORMING EFFICIENT FAILOVER AND VIRTUAL MACHINE (VM) MIGRATION IN VIRTUAL DESKTOP INFRASTRUCTURE (VDI)

(71) Applicant: AMERICAN MEGATRENDS, INC., Norcross, GA (US)

(72) Inventors: Venkatesaperumal Kondalsamy, Chennai (IN); Varadachari Sudan Ayanam, Suwanee, GA (US); Jayachandran Gnanasekaran, Duluth, GA (US); Santhosh Samuel Mathews, Chennai (IN)

(73) Assignee: AMERICAN MEGATRENDS, INC., Norcross, GA (US)

( * ) Notice: Subject to any disclaimer, the term of this patent is extended or adjusted under 35 U.S.C. 154(b) by 120 days.

(21) Appl. No.: 14/572,902

(22) Filed: Dec. 17, 2014

(65) Prior Publication Data
US 2016/0179635 A1    Jun. 23, 2016

(51) Int. Cl.
*G06F 11/20*    (2006.01)
(52) U.S. Cl.
CPC ....... *G06F 11/203* (2013.01); *G06F 2201/805* (2013.01); *G06F 2201/815* (2013.01)
(58) Field of Classification Search
CPC .................................................... G06F 11/203
See application file for complete search history.

(56) References Cited

U.S. PATENT DOCUMENTS

| | | | |
|---|---|---|---|
| 2008/0189468 A1* | 8/2008 | Schmidt ............... | G06F 11/203 711/6 |
| 2011/0231696 A1* | 9/2011 | Ji ......................... | G06F 11/1438 714/3 |
| 2012/0303594 A1* | 11/2012 | Mewhinney ........ | G06F 11/1482 707/692 |
| 2014/0108854 A1* | 4/2014 | Antony ................ | G06F 11/203 714/4.2 |

* cited by examiner

*Primary Examiner* — Yolanda L Wilson
(74) *Attorney, Agent, or Firm* — Locke Lord LLP; Tim Tingkang Xia, Esq.

(57) ABSTRACT

Certain aspects direct to system for performing efficient failover and virtual machine (VM) migration in virtual desktop infrastructure (VDI). The system includes a plurality of computing devices functioning as nodes, and a virtual desktop controller. The virtual desktop controller includes a processor, a memory, and a storage device storing computer executable code. The code, when executed at the processor, is configured to configure the computing devices as a failover cluster of the system; assign one computing device as an active node; assign each of the other computing devices as a passive node, and configure a clustered shared volume (CSV) of physical disks as backup nodes of the active node; and monitor the computing devices of the failover cluster. When the active node of the failover cluster fails, the executed code configures assigns one of the passive node of the failover cluster as a new active node.

23 Claims, 8 Drawing Sheets

SYSTEM AND METHOD FOR PERFORMING EFFICIENT FAILOVER AND VIRTUAL MACHINE (VM) MIGRATION IN VIRTUAL DESKTOP INFRASTRUCTURE (VDI)

FIELD

The present disclosure relates generally to virtual desktop infrastructure (VDI) technology, and more particularly to systems and methods of performing efficient failover and virtual machine (VM) migration in VDI using memory arrays with caching.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Virtual desktop infrastructure (VDI) is a desktop-centric service that hosts user desktop environments on remote servers or personal computers, which are accessed over a network using a remote display protocol. Typically, a system applying VDI technology may include multiple computing devices and servers to perform different VDI related functions. However, if one of the computing devices or one of the servers fail, the corresponding functions performed by the failed computing device or the failed server may be interrupted.

Therefore, an unaddressed need exists in the art to address the aforementioned deficiencies and inadequacies.

SUMMARY

Certain aspects of the disclosure direct to a system for performing efficient failover and virtual machine (VM) migration in virtual desktop infrastructure (VDI). In certain embodiments, the system includes a plurality of computing devices and a virtual desktop controller communicatively connected to the computing device via a network. The virtual desktop controller includes a processor, a memory, and a storage device storing computer executable code. The code, when executed at the processor, is configured to: configure a failover cluster of the system, wherein the failover cluster comprises the computing devices; configure an active node of the failover cluster by assigning one of the computing devices of the failover cluster as the active node; configure at least one passive node of the failover cluster by assigning each of the other of the computing devices of the failover cluster as the passive node and a first backup node of the active node; configure a clustered shared volume (CSV) of physical disks as a second backup node of the active node; monitor the computing devices of the failover cluster; and when the active node of the failover cluster fails, configure a new active node for the failover cluster by assigning one of the passive node of the failover cluster as the new active node with no or minimal down time of the system.

In certain embodiments, each of the computing devices assigned as the passive node comprises identical hardware and software components to the computing device being assigned as the active node.

In certain embodiments, each of the computing devices of the failover cluster is a virtual machine server storing the hypervisor and the plurality of VMs, where the virtual desktop controller is connected to the virtual machine server through an interface.

In certain embodiments, the code, when executed at the processor, is further configured to: control the virtual machine server being assigned as the active node to execute the hypervisor and to execute the VMs on the executed hypervisor; and control the active node to copy information stored in the active node to the passive node and the CSV, such that the information stored in the active node is identical to backup information stored in the passive node and the CSV.

In certain embodiments, the code, when executed at the processor, is further configured to: when the failed active node of the failover cluster recovers, configure the recovered active node as a new passive node for the failover cluster with no or minimal down time of the system.

In certain embodiments, the code includes a snap VDI manager (SVM). In certain embodiments, the SVM includes: a data store storing information of the system, wherein the information of the system comprises cluster configuration information for the failover cluster; a VM control module configured to control the virtual machine server being assigned as the active node to execute the hypervisor and to execute the VMs on the executed hypervisor; a backup module configured to control the active node to copy the information stored in the active node to the passive node and the CSV; a SVM monitor engine configured to monitor the computing devices of the failover cluster and generate corresponding monitoring information, and to determine whether each of the computing devices fails or recovers based on the monitoring information; and a configuration module configured to: configure the failover cluster of the system based on the cluster configuration information, configure the active node, configure the passive node, configure the CSV, when the SVM monitor engine determines based on the monitoring information that the active node of the failover cluster fails, configure the new active node for the failover cluster by assigning one of the passive nodes of the failover cluster as the new active node with no or minimal down time of the system, and when the SVM monitor engine determines based on the monitoring information that the failed active node of the failover cluster recovers, configure the recovered active node as the new passive node for the failover cluster with no or minimal down time of the system.

In certain embodiments, the SVM further includes a user interface module for displaying the monitoring information on a display device.

In certain embodiments, the configuration module is configured to configure the failover cluster of the system based on the cluster configuration information by: adding each of the computing devices into the failover cluster based on the cluster configuration information; configuring each of the computing devices; and for each of the computing devices, launching a random access memory (RAM) disk on a volatile memory array using a RAM disk driver; deploying the VMs to the RAM disk; and executing the VMs from the RAM disk.

In certain embodiments, the SVM monitor engine is configured to monitor the computing devices of the failover cluster by: monitoring hardware components of each of the computing devices; and monitoring the RAM disk of each of the computing devices.

In certain embodiments, the backup module is configured to control the active node to copy the information stored in the active node to the passive node and the CSV by controlling the RAM disk driver at the active node to: in response to writing data to the RAM disk of the active node, write the data to the RAM disk of the passive node in a write-through mode; and write the data to the CSV in a write-slow mode.

Certain aspects of the disclosure direct to a method for performing efficient failover and VM migration in VDI. In certain embodiments, the method includes: configuring, by a snap VDI manager (SVM) executed at a processor of a virtual desktop controller, a failover cluster of a VDI system, wherein the failover cluster comprises a plurality of computing devices of the VDI system, and wherein the virtual desktop controller is communicatively connected to the computing devices via a network; configuring, by the executed SVM, an active node of the failover cluster by assigning one of the computing devices of the failover cluster as the active node; configuring, by the executed SVM, at least one passive node of the failover cluster by assigning each of the other of the computing devices of the failover cluster as the passive node and a first backup node of the active node; configuring, by the executed SVM, a clustered shared volume (CSV) of physical disks as a second backup node of the active node; monitoring, by the executed SVM, the computing devices of the failover cluster; and when the active node of the failover cluster fails, configuring, by the executed SVM, a new active node for the failover cluster by assigning one of the passive node of the failover cluster as the new active node with no or minimal down time of the VDI system.

In certain embodiments, each of the computing devices assigned as the passive node comprises identical hardware and software components to the computing device being assigned as the active node.

In certain embodiments, each of the computing devices of the failover cluster is a virtual machine server storing the hypervisor and the plurality of VMs, where the virtual desktop controller is connected to the virtual machine server through an interface.

In certain embodiments, the method further includes: controlling, by the executed SVM, the virtual machine server being assigned as the active node to execute the hypervisor and to execute the VMs on the executed hypervisor; controlling, by the executed SVM, the active node to copy information stored in the active node to the passive node and the CSV, such that the information stored in the active node is identical to backup information stored in the passive node and the CSV; and when the failed active node of the failover cluster recovers, configuring, by the executed SVM, the recovered active node as a new passive node for the failover cluster with no or minimal down time of the VDI system.

In certain embodiments, the SVM includes: a data store storing information of the VDI system, wherein the information of the VDI system comprises cluster configuration information for the failover cluster; a VM control module configured to control the virtual machine server being assigned as the active node to execute the hypervisor and to execute the VMs on the executed hypervisor; a backup module configured to control the active node to copy the information stored in the active node to the passive node and the CSV; a SVM monitor engine configured to monitor the computing devices of the failover cluster and generate corresponding monitoring information, and to determine whether each of the computing devices fails or recovers based on the monitoring information; a user interface module for displaying the monitoring information on a display device; and a configuration module configured to: configure the failover cluster of the VDI system based on the cluster configuration information, configure the active node, configure the passive node, configure the CSV, when the SVM monitor engine determines based on the monitoring information that the active node of the failover cluster fails, configure the new active node for the failover cluster by assigning one of the passive nodes of the failover cluster as the new active node with no or minimal down time of the VDI system, and when the SVM monitor engine determines based on the monitoring information that the failed active node of the failover cluster recovers, configure the recovered active node as a new passive node for the failover cluster with no or minimal down time of the VDI system.

In certain embodiments, the configuration module is configured to configure the failover cluster of the VDI system based on the cluster configuration information by: adding each of the computing devices into the failover cluster based on the cluster configuration information; configuring each of the computing devices; and for each of the computing devices, launching a random access memory (RAM) disk on a volatile memory array using a RAM disk driver; deploying the VMs to the RAM disk; and executing the VMs from the RAM disk.

In certain embodiments, the SVM monitor engine is configured to monitor the computing devices of the failover cluster by: monitoring hardware components of each of the computing devices; and monitoring the RAM disk of each of the computing devices.

In certain embodiments, the backup module is configured to control the active node to copy the information stored in the active node to the passive node and the CSV by controlling the RAM disk driver at the active node to: in response to writing data to the RAM disk of the active node, write the data to the RAM disk of the passive node in a write-through mode; and write the data to the CSV in a write-slow mode.

Certain aspects of the disclosure direct to a non-transitory computer readable medium storing computer executable code. In certain embodiments, the code, when executed at a processor of a virtual desktop controller, is configured to: configure a failover cluster of a virtual desktop infrastructure (VDI) system, wherein the failover cluster comprises a plurality of computing devices of the VDI system, and wherein the virtual desktop controller is communicatively connected to the computing devices via a network; configure an active node of the failover cluster by assigning one of the computing devices of the failover cluster as the active node; configure at least one passive node of the failover cluster by assigning each of the other computing devices of the failover cluster as the passive node and a first backup node of the active node; configure a clustered shared volume (CSV) of physical disks as a second backup node of the active node; monitor the computing devices of the failover cluster; and when the active node of the failover cluster fails, configure a new active node for the failover cluster by assigning one of the passive node of the failover cluster as the new active node with no or minimal down time of the VDI system.

In certain embodiments, each of the computing devices assigned as the passive node comprises identical hardware and software components to the computing device being assigned as the active node.

In certain embodiments, each of the computing devices of the failover cluster is a virtual machine server storing the hypervisor and the plurality of VMs, wherein the virtual desktop controller is connected to the virtual machine server through an interface.

In certain embodiments, the code, when executed at a processor of a virtual desktop controller, is further configured to: control the virtual machine server being assigned as the active node to execute the hypervisor and to execute the VMs on the executed hypervisor; control the active node to copy information stored in the active node to the passive node and the CSV, such that the information stored in the active node is identical to backup information stored in the passive node and the CSV; and when the failed active node of the failover cluster recovers, configure the recovered active node as a new passive node for the failover cluster with no or minimal down time of the VDI system.

In certain embodiments, the code includes: a data store storing information of the system, wherein the information of the system comprises cluster configuration information for the failover cluster; a VM control module configured to control the virtual machine server being assigned as the active node to execute the hypervisor and to execute the VMs on the executed hypervisor; a backup module configured to control the active node to copy the information stored in the active node to the passive node and the CSV; a snap VDI manager (SVM) monitor engine configured to monitor the computing devices of the failover cluster and generate corresponding monitoring information, and to determine whether each of the computing devices fails or recovers based on the monitoring information; a user interface module for displaying the monitoring information on a display device; and a configuration module configured to: configure the failover cluster of the system based on the cluster configuration information, configure the active node, configure the passive node, configure the CSV, when the SVM monitor engine determines based on the monitoring information that the active node of the failover cluster fails, configure the new active node for the failover cluster by assigning one of the passive nodes of the failover cluster as the new active node with no or minimal down time of the VDI system, and when the SVM monitor engine determines based on the monitoring information that the failed active node of the failover cluster recovers, configure the recovered active node as a new passive node for the failover cluster with no or minimal down time of the VDI system.

In certain embodiments, the configuration module is configured to configure the failover cluster of the VDI system based on the cluster configuration information by: adding each of the computing devices into the failover cluster based on the cluster configuration information; configuring each of the computing devices; and for each of the computing devices, launching a random access memory (RAM) disk on a volatile memory array using a RAM disk driver; deploying the VMs to the RAM disk; and executing the VMs from the RAM disk.

In certain embodiments, the SVM monitor engine is configured to monitor the computing devices of the failover cluster by: monitoring hardware components of each of the computing devices; and monitoring the RAM disk of each of the computing devices.

In certain embodiments, the backup module is configured to control the active node to copy the information stored in the active node to the passive node and the CSV by controlling the RAM disk driver at the active node to: in response to writing data to the RAM disk of the active node, write the data to the RAM disk of the passive node in a write-through mode; and write the data to the CSV in a write-slow mode.

These and other aspects of the present disclosure will become apparent from the following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the detailed description and the accompanying drawings, wherein.

DETAILED DESCRIPTION

Figure 1:
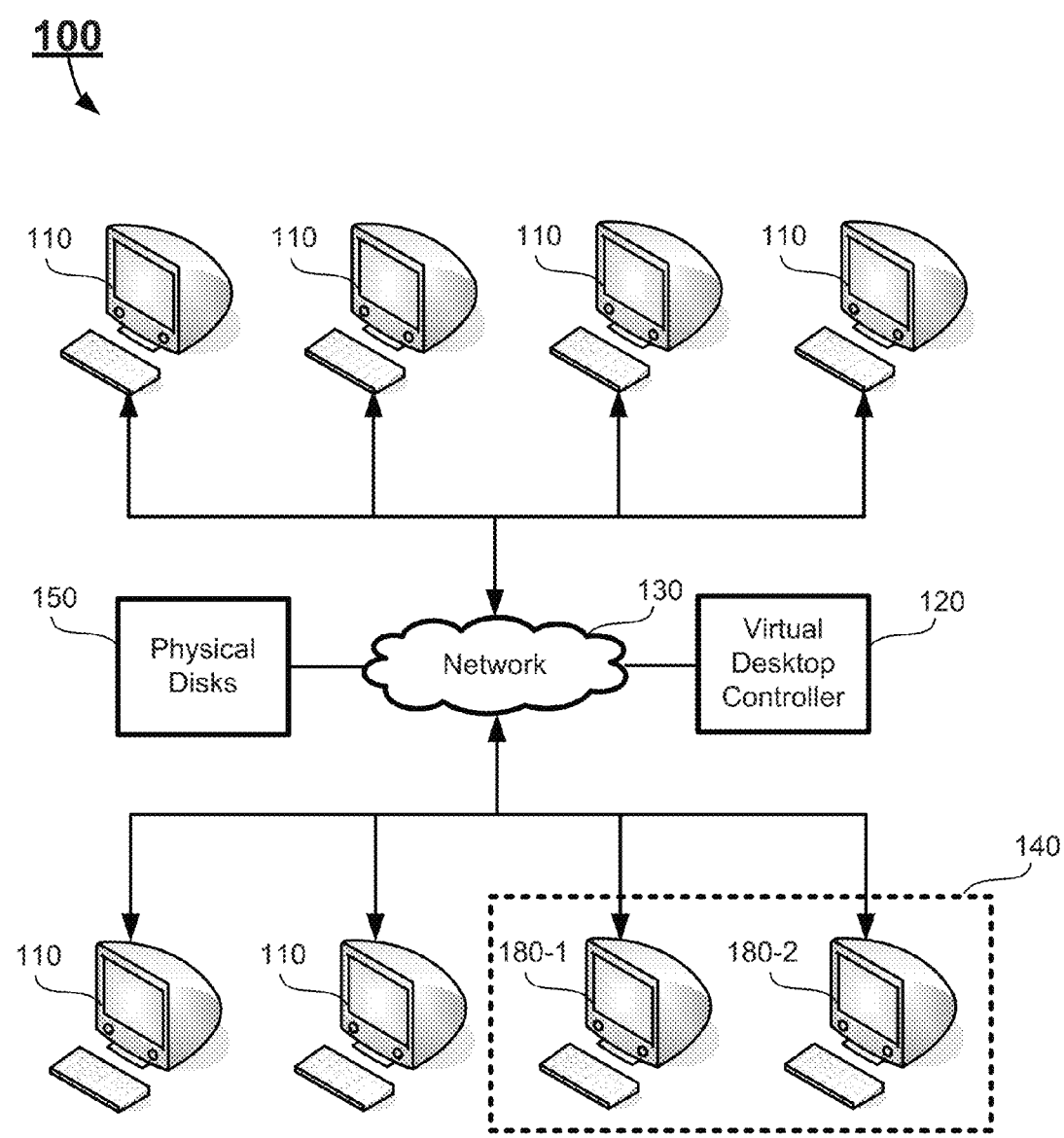
FIG. 1 schematically depicts a HA VDI system according to certain embodiments of the present disclosure.

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, "plurality" means two or more.

As used herein, the terms "comprising," "including," "carrying," "having," "containing," "involving," and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "code", as used herein, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

As used herein, the term "headless system" or "headless machine" generally refers to the computer system or machine that has been configured to operate without a monitor (the missing "head"), keyboard, and mouse.

The term "interface", as used herein, generally refers to a communication tool or means at a point of interaction between components for performing data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

The terms "chip" or "computer chip", as used herein, generally refer to a hardware electronic component, and may refer to or include a small electronic circuit unit, also known as an integrated circuit (IC), or a combination of electronic circuits or ICs.

The terms "node" or "computing node", as used herein, generally refer to a basic unit of computer systems. A node may be implemented by a physical device or a virtual device. For example, a computing device such as a personal computer, a laptop computer, a tablet or a mobile device may function as a node. A peripheral device such as a printer, a scanner or a system on chip (SoC) may also function as a node. A virtual device, such as a virtual machine (VM), may also function as a node. When defining nodes on the Internet, a node refers to a device or a data point having an IP address.

The term "cluster", as used herein, generally refers to a set of loosely or tightly connected computing devices (or more precisely, computing nodes) that work together such that, in many respects, they can be viewed as a single system. The components of a cluster are usually connected to each other through a network, with each node of the cluster being set to perform certain tasks.

The present disclosure relates to computer systems. As depicted in the drawings, computer components may include physical hardware components, which are shown as solid line blocks, and virtual software components, which are shown as dashed line blocks. One of ordinary skill in the art would appreciate that, unless otherwise indicated, these computer components may be implemented in, but not limited to, the forms of software, firmware or hardware components, or a combination thereof.

The apparatuses, systems and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

One aspect of the present disclosure is directed to a system of performing efficient failover and virtual machine (VM) migration in VDI using memory arrays with caching. As discussed above, VDI is a desktop-centric service that hosts user desktop environments on remote servers or personal computers, which are accessed over a network using a remote display protocol. In certain embodiments, for better performance, the VDI system may include multiple servers, which use the random access memory (RAM) disks as storages instead of non-volatile storages such as solid state drives (SSDs) or hard disk drives (HDDs). For clustering and high availability (HA) purposes, the VDI system may include two or more identical servers to form a failover cluster. In certain embodiments, the failover cluster requires two RAM disks, one in each server, where the VMs are created. One of the servers functions as an active node of the failover cluster, and the other server functions as a passive node (or a mirrored volume) and a backup node. In certain embodiments, a clustered shared volume (CSV) is provided as a second backup node for the active node. To backup information of the active node, a mirroring process is performed on the RAM disks such that the data in the RAM disk of the active node will be copied to the RAM disk of the passive node and the CSV. Thus, when failure occurs to the server functioning as the active node, by nature of the failover cluster, the other server functioning as the passive node may take over to become the new active node. During this stage, the data in the RAM disk of the new active node will be copied to the CSV. When the failed server comes back, the failed server will be assigned as the new passive node, such that the data in the RAM disk of the new active node will be copied to the RAM disk of the new passive node and the CSV.

FIG. 1 schematically depicts a VDI system according to certain embodiments of the present disclosure. The system 100 is capable of performing efficient failover and VM migration in VDI using with memory arrays with caching. As shown in FIG. 1, the system 100 includes a plurality of computing devices 110, a virtual desktop controller 120, and physical disks 150. Among the computing devices 110, at least two of the computing devices 110 are virtual machine servers 180. The computing devices 110 and the virtual machine servers 180 are communicatively interconnected by a network 130. The network 130 may be a wired or wireless network, and may be of various forms, such as a public network and a private network. Examples of the network 130 may include, but not limited to, a local area network (LAN) or wide area network (WAN) including the Internet. In certain embodiments, two or more different networks 130 may be applied to connect the computing devices 110 and the virtual machine servers 180. In certain embodiments, the system 100 may include three types of network 130: a heartbeat network, the Internet, and a virtual machine network. The use of the different types of network may be described in details later.

Each of the computing devices 110 may be a general purpose computer server system or a headless server. Examples of the computing devices 110 may include, but not limited to, the virtual machine server 180, a thin client computing device, or any other server or computing device for the system 100. In certain embodiments, the computing devices 110 function as a plurality of computing nodes, where each of the computing nodes comprises one of the computing devices 110. The configuration of the computing nodes of the system 100 may be predetermined.

Further, the computing nodes of the system 100 may be further configured to form at least one cluster. In certain embodiments, each of the at least one cluster includes multiple computing devices 110. For example, FIG. 1 shows a failover cluster 140, which includes two virtual machine servers 180 (respectively labeled as 180-1 and 180-2), and a cluster 150 which includes four of the computing devices 110. Each of the virtual machine servers 180 in the failover cluster 140 functions as a single computing node. Thus, the failover cluster 140 includes two computing nodes. Although not shown in FIG. 1, the system 100 may include other clusters. The configuration of the clusters of the system 100 may be predetermined. In certain embodiments, the administrator of the system 100 may change the configuration of the failover cluster 140 or any of the clusters of the system 100.

In certain embodiments, the two computing nodes of the failover cluster 140 are configured as an active node and a passive node. For example, based on a predetermined cluster configuration information for the failover cluster 140, the virtual machine server 180-1 may be assigned as the active node of the failover cluster 140, and the virtual machine server 180-2 may be assigned as the passive node of the failover cluster 140. Specifically, the passive node of the failover cluster 140 functions as a first backup node of the active node of the failover cluster 140, which will be described in detail later.

The physical disks 150 are used to form a storage pool, which may implement a CSV of the system 100 to function as a second backup node of the active node of the failover cluster 140. The CSV is a shared disk containing a volume that is made accessible for read and write operations by all nodes within the failover cluster 140. In certain embodiments, the physical disks 150 may be Just a Bunch of Disks (JBOD), which are hard disks not configured according to the redundant array of independent disks (RAID). In certain embodiments, the JBOD may be implemented under any computer storage protocols, such as the serial attached SCSI (SAS) protocol. Details of the operation of the CSV will be described later.

Figure 2A:
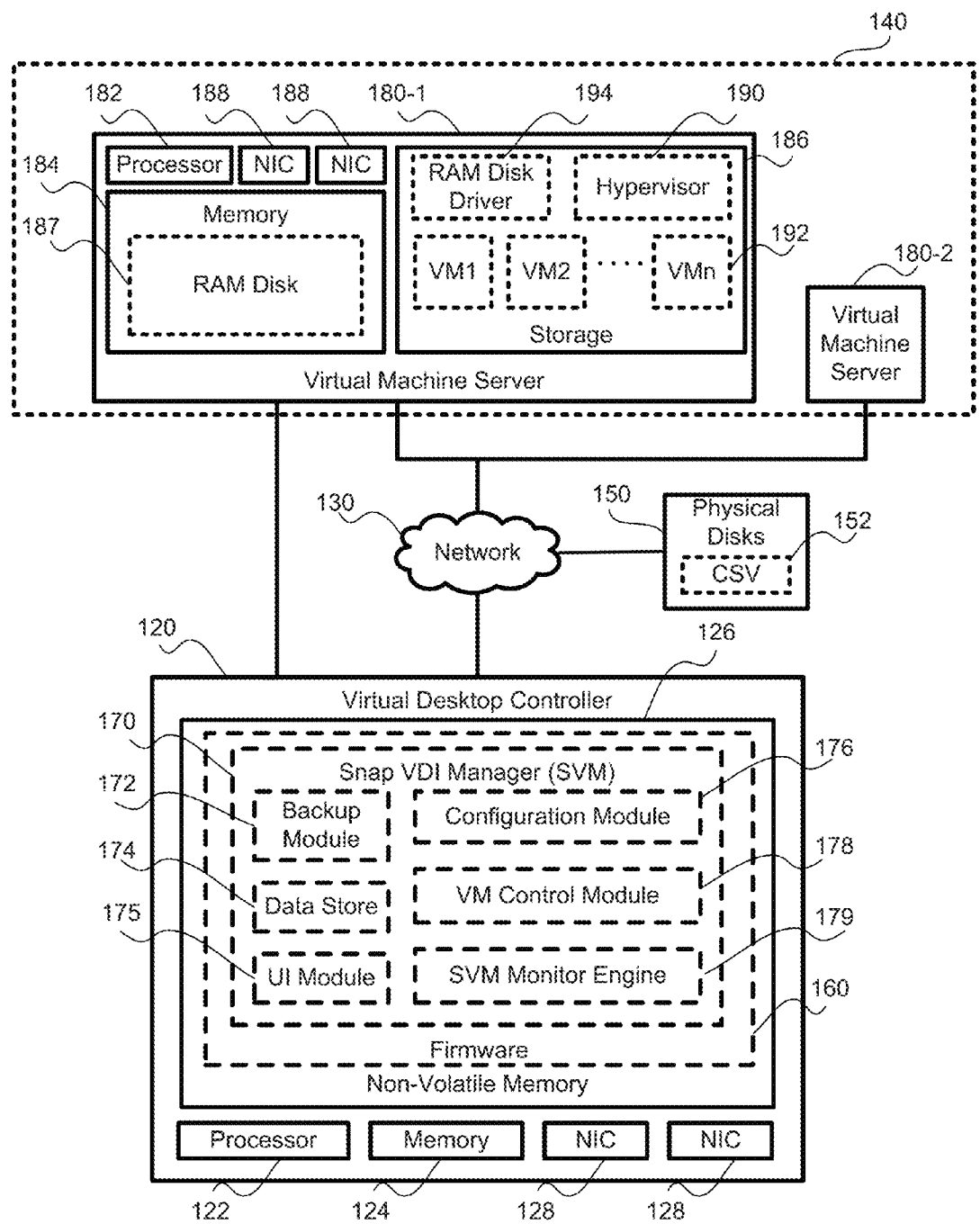
FIG. 2A schematically depicts a HA VDI system according to certain embodiments of the present disclosure.

FIG. 2A schematically depicts a VDI system according to certain embodiments of the present disclosure. Specifically, FIG. 2A shows a part of the system 100, which includes a virtual desktop controller 120, the two virtual machine servers 180-1 and 180-2 of the failover cluster 140, the physical disks 150, and the network 130. It should be particularly noted that, for illustration purposes, the components of the virtual machine server 180-2 are identical to the components of the virtual machine server 180-1, and are thus not illustrated in detail.

Each of the virtual machine servers 180 is a computing device which serves as a server for providing virtual machine services for the system 100. In certain embodiments, the virtual machine servers 180 may include necessary hardware and software components to perform certain predetermined tasks. For example, as shown in FIG. 2A, the virtual machine server 180-1 includes a processor 182, a memory 184, a storage 186 and two network interface cards (NICs) 188. Further, the virtual machine server 180-1 may include other hardware components and software components (not shown) to perform its corresponding tasks. Examples of these hardware and software components may include, but not limited to, other required memory, interfaces, buses, Input/Output (I/O) modules and peripheral devices. Although not explicitly shown in FIG. 2A, the other virtual machine server 180-2 of the failover cluster 140 may have identical hardware and software components to the virtual machine server 180-1.

The processor 182 is configured to control operation of the virtual machine server 180-1. In certain embodiments, the processor 182 may be a central processing unit (CPU). The processor 182 can execute any computer executable code or instructions, such as the hypervisor 190, the RAM disk driver 194, an operating system (OS), or other applications of the computing device 110. In certain embodiments, the virtual machine server 180-1 may run on more than one processor, such as two processors, four processors, eight processors, or any suitable number of processors. In certain embodiments, the other virtual machine server 180-2 of the failover cluster 140 may have identical processor or processors to the processor 182 of the virtual machine server 180-1.

The memory 184 can be a volatile memory, such as the random-access memory (RAM), for storing the data and information during the operation of the virtual machine server 180-1. In certain embodiments, the memory 184 may be a volatile memory array. In certain embodiments, a RAM disk 187 is created in the memory 184. In certain embodiments, the other virtual machine server 180-2 of the failover cluster 140 may have identical memory to the memory 184 of the virtual machine server 180-1, and an identical RAM disk to the RAM disk 187 is created in the memory of the other virtual machine server 180-2. In certain embodiments, the RAM disk 187 is created by executing the RAM disk driver 194, which allocates a block of the memory 184 as if the memory block were a physical storage. In other words, the RAM disk 187 is formed by emulating a virtual storage using the block of the memory 184. The storage emulated by the RAM disk 187 can be any storage, such as memory cards, USB drives, hard drives, floppy disks, optical drives, or any other types of data storage devices.

The storage 186 is a non-volatile data storage media for storing the applications of the virtual machine server 180-1. Examples of the storage 186 may include flash memory, memory cards, USB drives, hard drives, floppy disks, optical drives, or any other types of data storage devices. In certain embodiments, the other virtual machine server 180-2 of the failover cluster 140 may have an identical storage to the storage 186 of the virtual machine server 180-1, and the applications stored in the storage of the other virtual machine server 180-2 are also identical to the applications stored in the storage 186 of the virtual machine server 180-1.

The NICs 188, sometimes referred to as network interface controllers, are computer hardware components that connect the virtual machine server 180-1 to the network 130. As shown in FIG. 2A, the virtual machine server 180-1 includes two NICs 188. In certain embodiments, each of the virtual machine servers 180-1 and 180-2 may include at least one NIC 188. For example, when the system 100 includes multiple networks 130, the virtual machine server 180-1 may require multiple NICs 188, such that the virtual machine server 180-1 may be connected to each of the networks 130 via each of the NICs 188. In certain embodiments, the number of the NICs 188 of the virtual machine server 180-1 may be determined based on the types of network being provided in the system 100. For example, as discussed above, the system 100 may include three types of network 130: a heartbeat network, the Internet, and a virtual machine network. In this case, the virtual machine server 180-1 may include three NICs 188, and each NIC 188 is configured to perform network communicate with one of the three types of network 130. In certain embodiments, the other virtual machine server 180-2 of the failover cluster 140 may have identical NICs to the NICs 188 of the virtual machine server 180-1.

As shown in FIG. 2A, the storage 186 of the virtual machine server 180-1 stores a hypervisor 190, a plurality of VMs 192, and a RAM disk driver 194. In certain embodiments, the storage 186 of the virtual machine server 180-1 may store other applications necessary for the operation of the virtual machine server 180-1. In certain embodiments, the other virtual machine server 180-2 of the failover cluster 140 may have identical hypervisor, VMs and RAM disk driver to the hypervisor 190, the VMs 192, and the RAM disk driver 194 stored in the identical storage to the storage 186 of the virtual machine server 180-1

The RAM disk driver 194 is a software program that emulates the operation and controls the RAM disk 187. The RAM disk driver 194 includes functionalities for creating and accessing the RAM disk 187 in the memory 184, and configuration settings of the RAM disk 187. In certain embodiments, the functions for creating the RAM disk 187 includes allocating a block of the memory 184 for the RAM disk 187, setting up the RAM disk 187 according to the configuration settings, mounting the RAM disk 187 to the virtual machine server 180-1, and assigning backup storages for the RAM disk 187. The configuration settings of the RAM disk 187 include the storage type and partition type of the RAM disk 187, the size of the RAM disk 187, and information of the assigned backup storages for the RAM disk 187.

The hypervisor 190 is a program that allows multiple VM instances to run simultaneously and share a single hardware host, such as the virtual machine server 180. The hypervisor 190, when executed at the processor 182 of the virtual machine server 180-1 or any other processor, implements hardware virtualization techniques and allows one or more operating systems or other applications to run concurrently as guests of one or more virtual machines on the host server (i.e., the virtual machine server 180-1). For example, a plurality of users, each from one of the thin clients (e.g., the computing device 110), may attempt to run operating systems in the system 100. The hypervisor 190 allows each user to run an operating system instance as a VM. In certain embodiments, the hypervisor 190 can be of various types and designs, such as MICROSOFT HYPER-V, XEN, VMWARE ESX, or other types of hypervisors suitable for the system 100.

Figure 2B:
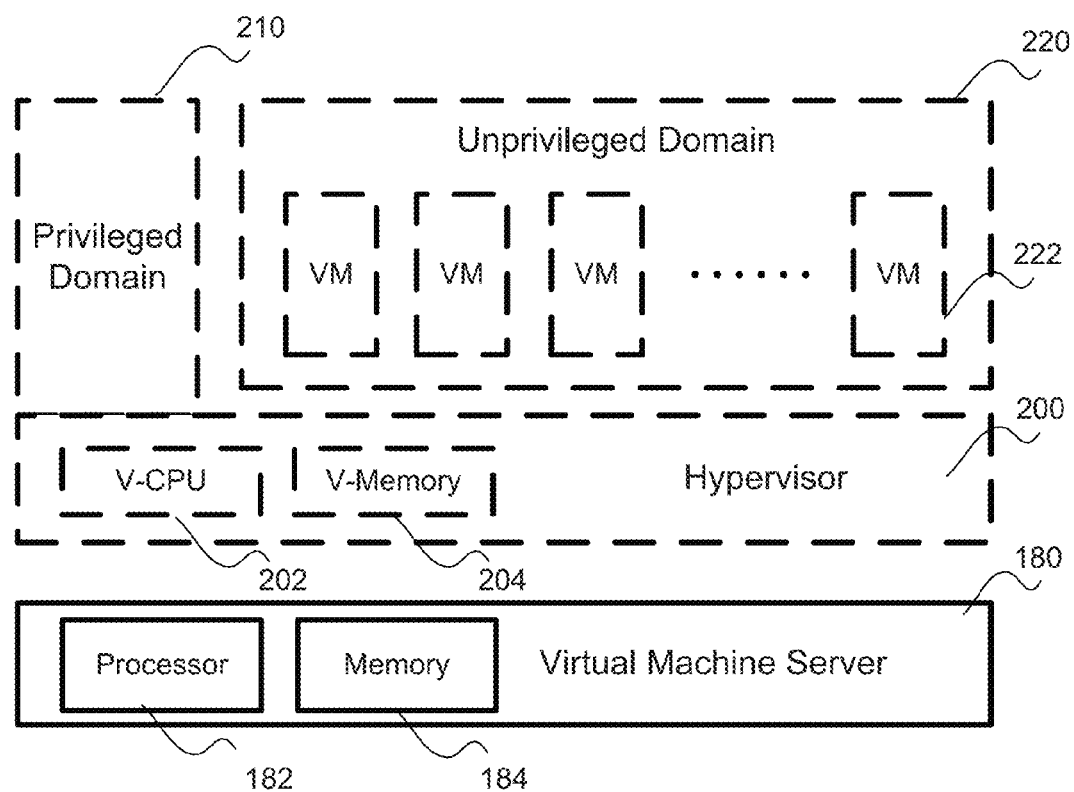
FIG. 2B schematically depicts the execution of the VMs on the system according to certain embodiments of the present disclosure.

FIG. 2B schematically depicts the execution of the VM's on the system according to certain embodiments of the present disclosure. As shown in FIG. 2B, when the hypervisor instance 200 runs on the virtual machine server 180, the hypervisor 200 emulates a virtual computer machine, including a virtual CPU 202 and a virtual memory 204. The hypervisor 200 also emulates a plurality of domains, including a privileged domain 210 and an unprivileged domain 220 for the VM. A plurality of VM's 222 can run in the unprivileged domain 220 of the hypervisor 200 as if they are running directly on a physical computer.

It should be noted that, although FIG. 2A shows that the failover cluster 140 includes two virtual machine servers 180-1 and 180-2, an administrator of the system 100 may configure the failover cluster 140 to include more than two virtual machine servers 180. In certain embodiments, the failover cluster 140 may include three or more virtual machine servers 180. Among the virtual machine servers 180 of the failover cluster 140, only one virtual machine server 180 (e.g., the virtual machine server 180-1) functions as the active node, and the other virtual machine servers 180 (e.g., the virtual machine server 180-2) function as the passive node. When the system 100 is in operation, only the active node (e.g., the virtual machine server 180-1) is in operation to execute the hypervisor 190 and the VMs 192 on the executed hypervisor. Each of the other virtual machine servers 180, which functions as one of the passive nodes, serves as the first backup node of the active node.

Referring back to FIG. 2A, the virtual desktop controller 120 is a controller to control the configuration and validation of the components of the virtual machine servers 180. In certain embodiments, the virtual desktop controller 120 may be implemented by a service processor (SP) or a baseboard management controller (BMC), which may be located in the virtual machine server 180-1. The SP or the BMC is a specialized microcontroller that manages the interface between system management software and platform hardware. Different types of sensors may be built into a host computer where the SP/BMC is located (e.g., the virtual machine server 180-1), and the SP/BMC may reads these sensors to obtain parameters such as temperature, cooling fan speeds, power status, operating system status, etc. The SP/BMC may be configured to monitor the sensors and may send out-of-band (OOB) alerts to a system administrator of the host computer if any of the parameters do not stay within preset limits, indicating a potential failure of the host computer. In certain embodiments, the administrator may also remotely communicate with the SP/BMC from any of the computing devices 110 via the network 130 to take remote action to the host computer. For example, when the SP/BMC is located in the virtual machine server 180-1, the administrator may reset the virtual machine server 180 from any of the computing device 110 through the SP/BMC, and may obtain system information of the virtual machine server 180-1 OOB without interrupting the operation of the virtual machine server 180-1.

In certain embodiments, the system 100 may include other components such that the SP/BMC may be configured to monitor these components. For example, different types of sensors may be built into the physical disks 150, such as the JBOD, and the SP/BMC may reads these sensors to obtain parameters of the JBOD, such as temperature, cooling fan speeds, power status, operating system status, etc. Thus, the administrator may obtain system information of the JBOD OOB via the WMI without interrupting the operation of the virtual machine server 180.

It should be noted that the virtual desktop controller 120 is not necessarily implemented by the SP/BMC as shown in FIG. 2A. In certain embodiments, the virtual desktop controller 120 may be implemented in the virtual machine server 180-1 as a part of the virtual machine server 180-1. For example, the virtual desktop controller 120 may be implemented in the virtual machine server 180-1 and other servers of the system 100. In this case, the virtual desktop controller 120 may share the hardware and software components of the servers with other software components of the servers to perform certain predetermined tasks. In certain embodiments, the virtual desktop controller 120 may be implemented as a virtual machine within the virtual machine server 180-1 by one of the VMs 192. In certain embodiments, the virtual desktop controller 120 may be implemented by a separate computing device 110, which is independent from and not included in any of the servers or computing devices 110 of the system 100.

When the virtual desktop controller 120 is implemented as an independent SP/BMC, the virtual desktop controller 120 may include necessary hardware and software components to perform certain predetermined tasks. For example, as shown in FIG. 2A, the virtual desktop controller 120 includes a processor 122, a memory 124, a non-volatile memory 126 and two NICs 128. Further, the virtual desktop controller 120 may include other hardware components and software components (not shown) to perform its corresponding tasks. Examples of these hardware and software components may include, but not limited to, other required memory, interfaces, buses, I/O modules and peripheral devices.

The processor 122 is configured to control operation of the virtual desktop controller 120. In certain embodiments, the processor 122 may be a central processing unit (CPU). The processor 122 can execute any computer executable code or instructions, such as the firmware or other applications of the virtual desktop controller 120. In certain embodiments, the virtual desktop controller 120 may run on more than one processor, such as two processors, four processors, eight processors, or any suitable number of processors.

The memory 124 can be a volatile memory, such as the random-access memory (RAM), for storing the data and information during the operation of the virtual desktop controller 120.

The NICs 128 are computer hardware components that connect the virtual desktop controller 120 to the network 130. As shown in FIG. 2A, the virtual desktop controller 120 includes two NICs 128. As described above, For example, when the system 100 includes multiple networks 130, the virtual desktop controller 120 may require multiple NICs 128, such that the virtual desktop controller 120 may be connected to each of the networks 130 via each of the NICs 128. In certain embodiments, the number of the NICs 128 of the virtual desktop controller 120 may be determined based on the types of network being provided in the system 100. For example, as discussed above, the system 100 may include three types of network 130: a heartbeat network, the Internet, and a virtual machine network. In this case, the virtual desktop controller 120 may include three NICs 128, and each NIC 128 is configured to perform network communicate with one of the three types of network 130. If additional NICs are available, the additional NICs may be teamed to one or more of the three NICs 128 to increase the throughput.

The non-volatile memory 126 is a non-volatile data storage media for storing the firmware 160 and other computer executable code of the virtual desktop controller 120. Examples of the non-volatile memory 126 may include flash memory, memory cards, USB drives, hard drives, floppy disks, optical drives, or any other types of non-volatile data storage devices. The firmware 160 stored in the non-volatile memory 126 includes computer executable code that may be executed at the processor 122. As shown in FIG. 2A, the firmware 160 includes a snap VDI manager (SVM) 170, which includes multiple modules to perform different functions. As shown in FIG. 2A, the SVM 170 includes a backup module 172, a data store 174, a user interface (UI) module 175, a configuration module 176, a VM control module 178, and a SVM monitor engine 179.

The backup module 172 is configured to control the active node (i.e., the virtual machine server 180-1) to perform information backup from the active node (i.e., the virtual machine server 180-1) to the passive node (i.e. the virtual machine server 180-2) and the CSV 152 of the storage pool of the physical disks 150. In certain embodiments, the backup module 172 is configured to control the RAM disk driver 194 at the active node (i.e., the virtual machine server 180-1) to copy information stored in the RAM disk 187 of the active node (i.e., the virtual machine server 180-1) to the RAM disk of the passive node (i.e., the virtual machine server 180-2) and the CSV 152, such that the information stored in the RAM disk 187 of the active node (i.e., the virtual machine server 180-1) is identical to backup information stored in the RAM disk of the passive node (i.e., the virtual machine server 180-2) and the CSV 152.

In certain embodiments, in each of the virtual machine servers 180-1 and 180-2, the RAM disk driver 194 includes a module to perform data copying from the RAM disk 187 of the active node (i.e., the virtual machine server 180-1) to the RAM disk of the passive node (i.e., the virtual machine server 180-2) in a write-through mode, and to perform data copying from the the RAM disk 187 of the active node (i.e., the virtual machine server 180-1) to the CSV 152 in a write-slow mode. In this case, the backup module 172 is configured to control the RAM disk driver 194 at the active node (i.e., the virtual machine server 180-1) to copy information stored in the RAM disk 187 of the active node (i.e., the virtual machine server 180-1) immediately to the RAM disk of the passive node (i.e., the virtual machine server 180-2) in response to writing data to the RAM disk 187 of the active node (i.e., the virtual machine server 180-1). Further, the backup module 172 may control the RAM disk driver 194 at the active node (i.e., the virtual machine server 180-1) to copy information stored in the RAM disk 187 of the active node to the CSV 152 in the background. For example, the SVM monitor engine 179, in monitoring the operation of the system 100, may detect that a writing operation occurs in the RAM disk 187 of the active node. In response to the writing operation, the backup module 172 may control the RAM disk driver 194 at the active node to write the same data immediately to the RAM disk of the passive node in a write-through mode. The write-through mode is essentially a mirror mode, in which the same data written into the RAM disk 187 of the active node is mirrored (or copied) to the RAM disk of the passive node. In this case, the passive node, which functions as the first backup node of the active node, may serve as the backup of the active node. If the active node goes down, the passive node may be configured as a new active node with no or minimal down time of the system 100. Since the same data is written to both the RAM disk 187 of the active node and immediately to the RAM disk of the passive node, such process eliminates the possibility of data loss due to a system crash. On the other hand, the backup module 172 may control the RAM disk driver 194 at the active node to write the same data to the CSV in a write-slow mode. The write-slow mode is operated in the background and does not affect the operation of the active node. If a major disaster occurs in the system 100 such that both the active node and the passive node go offline, the CSV 152, which functions as the second backup node of the active node, may be use as the safety backup. In this case, an administrator may try to recover at least one of the virtual machine servers 180, such that the backup module 172 may backup the information stored in the CSV 152 back to the recovered virtual machine server 180 with no or minimal down time of the system 100.

The data store 174 is a database for storing information of the system 100. The information of the system 100 may include the cluster configuration information for the failover cluster 140 and other clusters of the system 100. Examples of the cluster configuration information may include, but not limited to, information of the computing devices (i.e. the virtual machine servers 180) of the failover cluster 140, information of a predetermined virtual machine server 180 (e.g., the virtual machine server 180-1) as the active node, information of the passive node (e.g., the virtual machine server 180-2), information of the CSV 152, or any other information related to configuration of the failover cluster 140.

The UI module 175 provides a UI available to a user of the virtual desktop controller 120 such that the user, through the UI, may input commands and instructions to the virtual desktop controller 120 to the virtual desktop controller 120 or receive information from the virtual desktop controller 120. Generally, the user of the virtual desktop controller 120 may be an administrator or an end user of the system 100. In some occasions, the UI provided by the UI module 175 may be a web-based graphical user interface (GUI), which is capable of being displayed on a display device (not shown) of the system 100 such that the user may perform operation and receive the information through the web-based GUI. In certain embodiments, the UI module 175 may provide other types of UI, such as a text-based interface, a voice operated interface, etc. In certain embodiments, the information being provided by the virtual desktop controller 120 and displayed by the UI to the user may include monitoring information of the system 100.

The configuration module 176 is a core module of the SVM 170 to perform configuration of all components of the system 100, including the failover cluster 140. For example, the configuration module 176 may configure the failover cluster 140 of the system based on the cluster configuration information stored in the data store 174. In certain embodiments, the configuration of the failover cluster 140 may include: adding each of the computing devices (e.g., the virtual machine servers 180) into the failover cluster 140 based on the cluster configuration information; configuring each of the virtual machine servers 180 of the failover cluster 140; for each of the virtual machine servers 180, launching the RAM disk 187 on the memory 184 using the RAM disk driver 194; deploying the VMs 192 to the RAM disk 187; and executing the VMs 192 from the RAM disk 187. Further, the configuration module 176 may configure the active node (e.g., the virtual machine server 180-1) of the failover cluster 140, the passive node (e.g., the virtual machine server 180-1) of the failover cluster 140, and the CSV 152. Details of the configurations will be hereinafter described.

The VM control module 178 is configured to control the virtual machine server 180-1, which is assigned as the active node of the failover cluster 140, to execute the hypervisor 190 and to execute the VMs 192 on the executed hypervisor 180. Generally, the VM control module 178 operates together with the configuration module 176 such that the executed VMs 192 may be properly configured. In certain embodiments, when the virtual machine server 180-1 is assigned as the active node of the failover cluster 140, the virtual desktop controller 120 controls the virtual machine server 180-1 to execute the hypervisor 190 and to execute the VMs 192 on the executed hypervisor. When the virtual machine server 180-2 is assigned as the active node of the failover cluster 140, the virtual desktop controller 120 controls the virtual machine server 180-2 to execute the hypervisor 190 and to execute the VMs 192 on the executed hypervisor.

The SVM monitor engine 179 is a monitoring module configured to monitor the hardware and software components of the system 100, which includes the computing devices 110 and the virtual machine servers 180. In certain embodiments, the monitoring processing includes monitoring hardware components of each of the computing devices 110 (e.g., the virtual machine servers 180), and monitoring the RAM disk 187 of each of the virtual machine servers 180. Based on the monitoring process, the SVM monitor engine may generate corresponding monitoring information of the computing devices 110 and the virtual machine servers 180. When the SVM monitor engine 179 monitors the virtual machine servers 180 and detects that one of the virtual machine servers 180 fails, or that a failed virtual machine server 180 recovers, the SVM monitor engine 179 may generate corresponding monitoring information to the detected failure or recovery of the virtual machine server 180, such that the configuration module 176 may perform configuration based on the corresponding monitoring information being detected.

As discussed above, in the operation of the system 100, one or more of the virtual machine server 180 may fail due to errors. Further, the failed virtual machine server 180 may recover. For example, when an error occurs in one of the virtual machine servers 180 the virtual machine server 180 fails. In response to the error, the failed virtual machine server 180 may reboot, and once the rebooting process is complete, the failed virtual machine server 180 recovers by coming back to operation.

In certain embodiments, when the SVM monitor engine 179 determines based on the monitoring information that the active node of the failover cluster 140 fails, the configuration module 176 may configure a new active node for the failover cluster 140 by assigning one of the passive node of the failover cluster 140 as the new active node. In certain embodiments, when the SVM monitor engine 179 determines based on the monitoring information that the failed active node of the failover cluster 140 recovers, the configuration module 176 may configure the recovered active node as a new passive node for the failover cluster 140. For example, when the virtual machine server 180-1 functions as the active node, the SVM monitor engine 179 may determine based on the monitoring information that the virtual machine server 180-1 fails. In this case, the configuration module 176 may assign the virtual machine server 180-2, which is a passive node of the failover cluster 140, as the new active node of the failover cluster 140. Thus, the virtual machine server 180-2 becomes the new active node of the failover cluster 140. Further, the SVM monitor engine 179 may keep monitoring the failed virtual machine server 180-1. When the SVM monitor engine 179 determines based on the monitoring information that the failed virtual machine server 180-1 recovers, the configuration module 176 may assign the recovered virtual machine server 180-1 as a new passive node for the failover cluster. Thus, the virtual machine server 180-1 becomes the new passive node of the failover cluster 140. The configuration of the new active node and the new passive node is generally referred to as a "swap" process, since the roles of the active node and the passive node of the failover cluster 140 are swapped.

A further aspect of the present disclosure is directed to a method for performing efficient failover and VM migration in VDI. In certain embodiments, the method includes a configuration process of the failover cluster, a backup of the failover cluster, and a swap process of the failover cluster, which will be hereinafter described in details.

Figure 3:
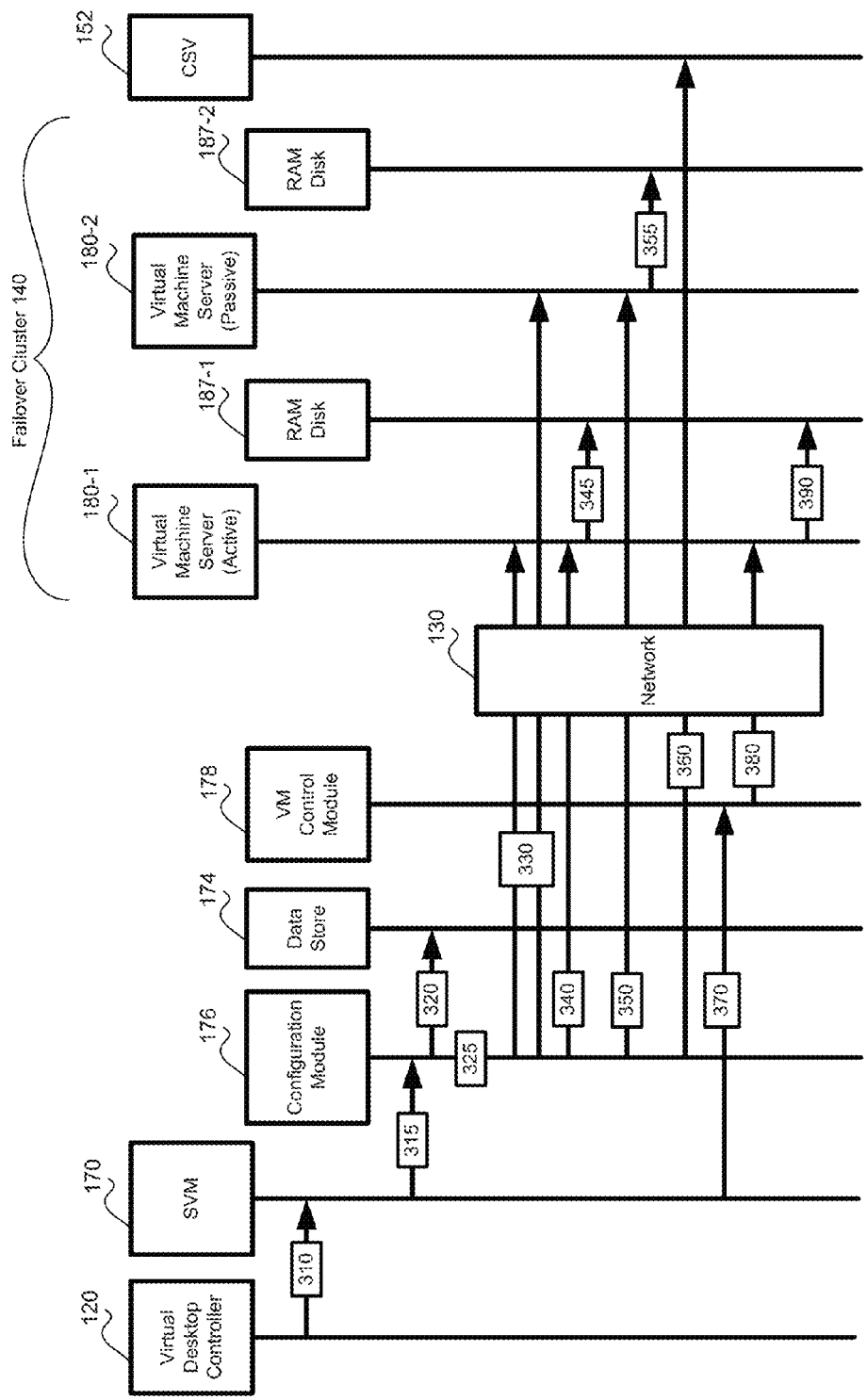
FIG. 3 schematically depicts the configuration process of the failover cluster by the SVM according to certain embodiments of the present disclosure.

FIG. 3 schematically depicts the configuration process of the failover cluster by the SVM according to certain embodiments of the present disclosure. In this embodiment, the failover cluster 140 includes two virtual machine servers 180-1 and 180-2, in which the virtual machine server 180-1 is predetermined as the active node, and the virtual machine server 180-2 is predetermined as the passive node.

At procedure 310, when the virtual desktop controller 120 is initiated, the virtual desktop controller 120 executes the SVM 170. In certain embodiments, the SVM 170 may perform certain preliminary discovery process of all computing device 110 of the system 100, including the virtual machine servers 180. In certain embodiments, the discovery process may be performed by a discovery engine (not shown).

At procedure 315, the SVM 170 calls for the configuration module 176 to perform configuration of the failover cluster 140. At procedure 320, the configuration module 176 retrieves the cluster configuration information for the failover cluster 140 from the data store 174. In certain embodiments, the cluster configuration information may include, but not limited to, information of the virtual machine servers 180-1 and 180-2 of the failover cluster 140, information of a predetermined virtual machine server 180 (e.g., the virtual machine server 180-1) as the active node, information of the passive node (e.g., the virtual machine server 180-2), information of the CSV 152, or any other information related to configuration of the failover cluster 140.

At procedure 325, the configuration module 176, based on the retrieved cluster configuration information, starts configuration of the failover cluster 140. At procedure 330, the configuration module 176, based on the retrieved cluster configuration information, adds the virtual machine servers 180-1 and 180-2 to the failover cluster 140. The adding process may be performed by periodic polling of the virtual machine servers 180 with a predetermined time interval (for example, every one minute). It should be noted that, for each polling process performed, one or more of the virtual machine servers 180 may be discovered in any random order. In other words, although FIG. 3 shows that the configuration module 176 adds the virtual machine server 180-1 before adding the virtual machine server 180-2, it is possible that the configuration module 176 may discover and add the virtual machine server 180-2 first before adding the virtual machine server 180-1. In certain embodiments, when the configuration module 176 adds the virtual machine servers 180 to the failover cluster 140, the configuration module 176 may send the corresponding information to the UI module 175 (not shown in FIG. 3), such that the UI module 175 generates a message through the UI to the user notifying the user of the creation of the failover cluster 140. In certain embodiments, during the adding procedure 330 of the virtual machine servers 180, the SVM monitor engine 179 (not shown in FIG. 3) may starts monitoring the virtual machine servers 180 and generating corresponding monitoring information.

At procedure 340, once the virtual machine servers 180 are added to the failover cluster 140, the configuration module 176 configures the virtual machine server 180-1 as the active node of the failover cluster 140. In certain embodiments, the configuration module 176 sends instructions to the virtual machine server 180-1 to create the RAM disk 187-1 on the memory (not shown in FIG. 3). At procedure 345, based on the instruction received from the configuration module 176, the virtual machine server 180-1 launches the RAM disk 187-1 on the memory. Once the RAM disk 187-1 is launched, the RAM disk 187-1 will be ready for deployment of the VMs.

When the configuration of the active node is complete, at procedure 350, the configuration module 176 configures the virtual machine server 180-2 as the passive node of the failover cluster 140 and the first backup node of the active node. In certain embodiments, the configuration module 176 sends instructions to the virtual machine server 180-2 to create the RAM disk 187-2 on the memory (not shown in FIG. 3). At procedure 355, based on the instruction received from the configuration module 176, the virtual machine server 180-2 launches the RAM disk 187-2 on the memory. Once the RAM disk 187-2 is launched, the RAM disk 187-2 will be ready for deployment of the VMs. It should be noted that, when the failover cluster 140 includes three or more virtual machine servers 180, such that two or more of the virtual machine servers 180 may function as passive nodes, each of the passive nodes will be configured.

When the configuration of the active node is complete, at procedure 350, the configuration module 176 configures the CSV 152 of the storage pool of the physical disks 150 as a second backup node of the active node. The configuration of the CSV 152 of the storage pool of the physical disks 150 will be described later.

In certain embodiments, the determination of the active node may be performed after configurations of the virtual machine servers 180-1 and 180-2 and the CSV 152. In other words, the configuration module 176 may perform the procedures 340-360 to configure the two virtual machine servers 180-1 and 180-2 and the CSV 152. Then, the configuration module 176 may select one of the virtual machine servers 180-1 and 180-2 (e.g., the virtual machine server 180-1) as the active node, and then assign the other virtual machine server (e.g., the virtual machine server 180-2) as the passive node and the first backup node, and the CSV 152 as the second backup node.

Once the configuration module 176 has configured the failover cluster 140 and the CSV 152, at procedure 370, the SVM 170 calls for the VM control module 178 to perform deployment and execution of the VMs. At procedure 380, the VM control module 178 controls the virtual machine server 180-1 (i.e., the active node) to deploy the VMs to the corresponding RAM disk 187-1. At procedure 390, the virtual machine server 180-1 deploys the VMs to the RAM disk 187-1, and starts executing the VMs on the RAM disk 187-1.

It should be particularly noted that the virtual machine server 180-1, which functions as the active node, is the server to provide virtual machine services for the system 100. Thus, the VM control module 178 may control the virtual machine server 180-1 (i.e., the active node) to deploy the VMs to the corresponding RAM disk 187-1, and may not necessary need to control the virtual machine server 180-2 (i.e., the passive node) to deploy the VMs. In certain embodiments, the information of the RAM disk 187-2 of the virtual machine server 180-2 may be generated by the backup module 172, which will be described later. Alternatively, in certain embodiments, the VM control module 178 may also control the virtual machine server 180-2 (i.e., the passive node) to deploy the VMs to the RAM disk 187-2, such that the information stored in the RAM disk 187-2 is the exact backup of the information stored in the RAM disk 187-1 of the active node.

In certain embodiments, the SVM starts the deployment and execution of the VMs at procedure 380-390 when the configuration of the active node (i.e., the virtual machine server 180-1) is complete. In other words, the procedures 380-390 may be performed simultaneously with the procedures 350-360.

During the configuration procedures of the failover cluster 140, if the SVM monitor engine 179 detects any error in any of the procedures, the SVM monitor engine 179 may control the UI module 175 to display the monitoring information to the user through the UI. Specifically, the UI module 175 may generate an error message related to the detected errors based on the monitoring information, and display the error message to the user through the UI.

Figure 4:
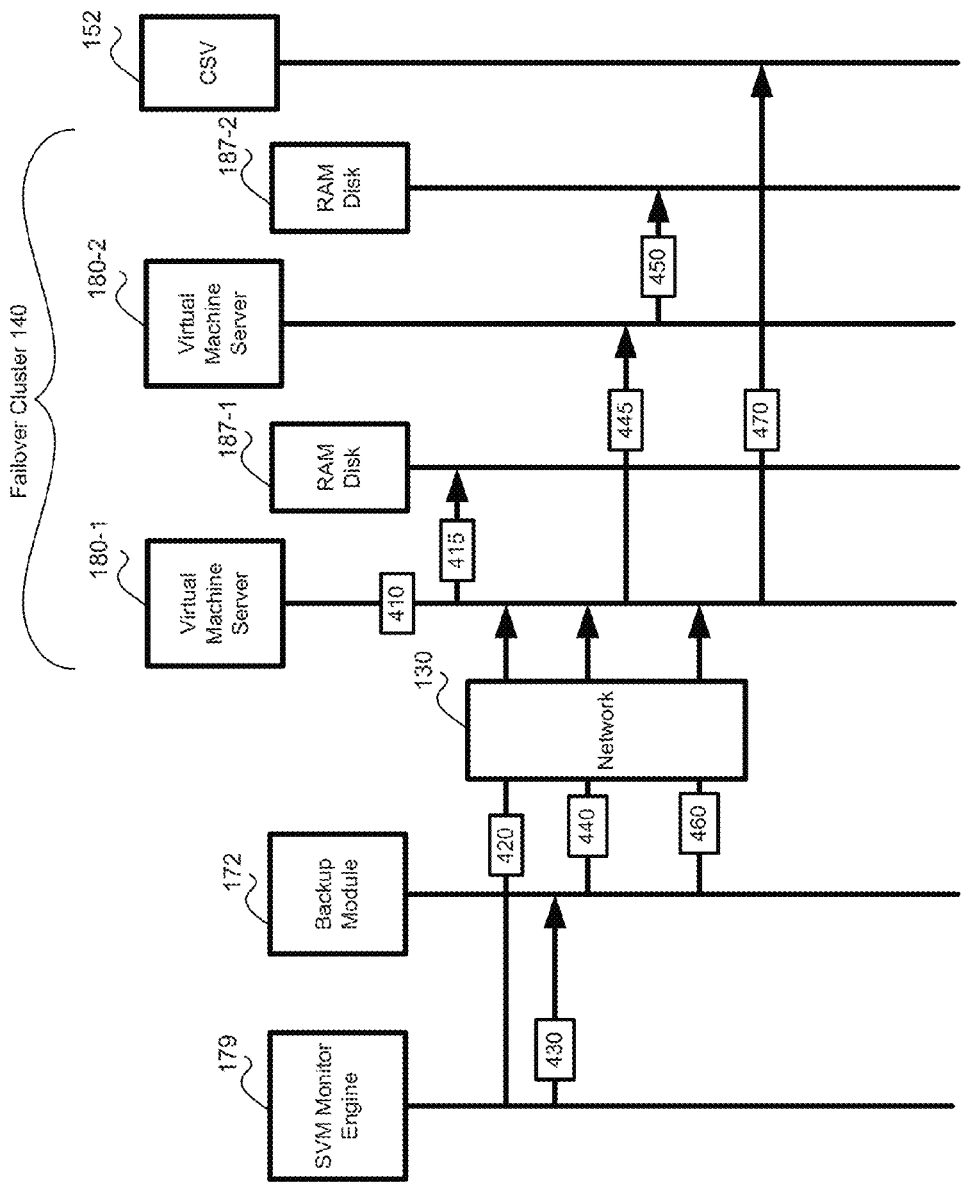
FIG. 4 schematically depicts the backup process of the failover cluster by the SVM according to certain embodiments of the present disclosure.

FIG. 4 schematically depicts the backup process of the failover cluster by the SVM according to certain embodiments of the present disclosure. In this embodiment, the failover cluster 140 includes two virtual machine servers 180-1 and 180-2, in which the virtual machine server 180-1 is predetermined as the active node, and the virtual machine server 180-2 is predetermined as the passive node. In certain embodiments, the backup process starts after the configuration process as shown in FIG. 3, and the virtual desktop controller 120 may perform configuration of the failover cluster 140 as shown in FIG. 3.

At procedure 410, the virtual machine server 180-1, during the operation of the virtual machine service, generates certain data to be written to the RAM disk 187-1. The data may be data related to the VMs. At procedure 415, the virtual machine server 180-1 performs the writing operation to write the data to the RAM disk 187-1.

At procedure 420, the SVM monitor engine 179 detects the writing operation at the procedure 415. At procedure 430, the SVM monitor engine 179 calls for the backup module 172 to perform backup procedures of the data.

In response to the writing operation at procedure 415, the backup module 172 may control the RAM disk driver 194 (not shown in FIG. 4) at the virtual machine server 180-1 (i.e., the active node) to immediately write the same data to the RAM disk 187-2 of the virtual machine server 180-2 (i.e., the passive node). At procedure 440, the backup module 172 may control the RAM disk driver 194 (not shown in FIG. 4) at the virtual machine server 180-1 (i.e., the active node) to send the same data to the virtual machine server 180-2. At procedure 445, in response to the control of the backup module 172, the virtual machine server 180-1 sends the same data immediately to the virtual machine server 180-2. At procedure 450, the virtual machine server 180-2, upon receiving the data from the virtual machine server 180-1, writes the same data immediately to the RAM disk 187-2 in a write-through mode. Since the same data is written to both the RAM disk 187 of the active node and immediately to the RAM disk of the passive node, such process eliminates the possibility of data loss due to a system crash.

Further, at procedure 460450, the backup module 172 may control the RAM disk driver 194 (not shown in FIG. 4) at the virtual machine server 180-1 (i.e., the active node) to write the same data to the CSV 152 in a write-slow mode. At procedure 470, in response to the control of the backup module 172, the virtual machine server 180-1 sends the same data to the CSV 152. The write-slow mode is operated in the background and does not affect the operation of the active node. If a major disaster occurs in the system 100 such that both the active node and the passive node go offline, the CSV 152, which functions as the second backup node of the active node, may be use as the safety backup.

During the backup procedures, the SVM monitor engine 179 keeps monitoring the failover cluster 140. If the SVM monitor engine 179 detects any error in any of the backup procedures, the SVM monitor engine 179 may control the UI module 175 to display the monitoring information to the user through the UI. Specifically, the UI module 175 may generate an error message related to the detected errors based on the monitoring information, and display the error message to the user through the UI. Thus, the user may determine the issues of the failover cluster 140 based on the error message, and perform corresponding solutions to resolve the issues.

Figure 5:
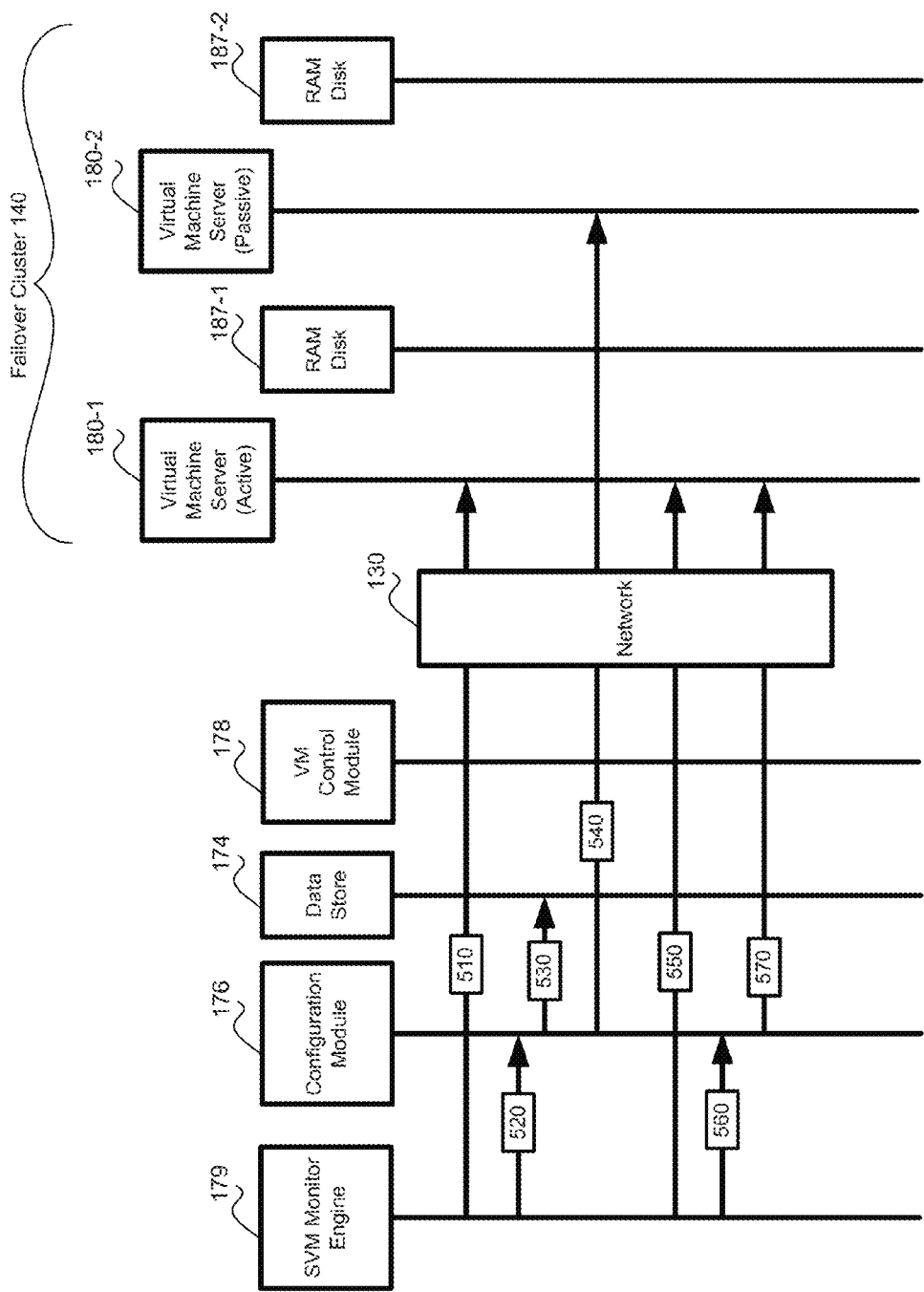
FIG. 5 schematically depicts the swap process of the failover cluster according to certain embodiments of the present disclosure.

FIG. 5 schematically depicts the swap process of the failover cluster according to certain embodiments of the present disclosure. In this embodiment, the failover cluster 140 includes two virtual machine servers 180-1 and 180-2, in which the virtual machine server 180-1 is predetermined as the active node, and the virtual machine server 180-2 is predetermined as the passive node. In certain embodiments, the swap process may occur at any time after the configuration process as shown in FIG. 3, and may occur simultaneously with the backup process as shown in FIG. 4. Thus, the virtual desktop controller 120 may perform configuration of the failover cluster 140 as shown in FIG. 3, and may perform backup of the active node of failover cluster 140 to the passive node and the CSV as shown in FIG. 4.

At procedure 510, the SVM monitor engine 179 keeps monitoring the operation of the virtual machine server 180-1 (i.e., the active node) of the failover cluster 140. When the SVM monitor engine 179 detects that the virtual machine server 180-1 (i.e., the active node) of the failover cluster 140 fails, at procedure 520, the SVM monitor engine 179 calls for the configuration module 176 to perform the swap process.

At procedure 530, the configuration module 176 retrieves the cluster configuration information for the failover cluster 140 from the data store 174 to obtain the information of the passive node. In this embodiment, there is only one passive node (i.e., the virtual machine server 180-2). In certain embodiments, the failover cluster 140 may include multiple passive nodes, and the configuration module 176 may select one of the passive nodes to perform the swap process.

At procedure 540, the configuration module 176, based on the retrieved cluster configuration information, configures a new active node for the failover cluster 140 by assigning the virtual machine server 180-2 (i.e., the passive node) of the failover cluster 140 as the new active node. Thus, the virtual machine server 180-2 now functions as the new active node of the failover cluster 140. It should be noted that, at this time, the configuration module 176 does nothing to the virtual machine server 180-1 (i.e., the old active node) because the virtual machine server 180-1 is still offline.

At procedure 550, the SVM monitor engine 179 keeps monitoring the failed virtual machine server 180-1 (i.e., the old active node) of the failover cluster 140. When the SVM monitor engine 179 detects that the failed virtual machine server 180-1 (i.e., the old active node) of the failover cluster 140 recovers, at procedure 560, the SVM monitor engine 179 calls for the configuration module 176 to perform the swap process. At procedure 570, the configuration module 176 configures the recovered virtual machine server 180-1 (i.e., the recovered active node) as a new passive node. Thus, the virtual machine server 180-2 now functions as the new passive node of the failover cluster 140.

As discussed above, the method utilizes the CSV 152 as a second backup node of the active node. In certain embodiments, the configuration of the CSV 152 of the storage pool of the physical disks 150 generally involves configuration of the storage pool, and configuration of the CSV. In certain embodiments, the configuration of the storage pool and the configuration of the CSV may be performed by the SVM 170, which may be implemented in a system 100 as shown in FIGS. 1 and 2A.

Figure 6A:
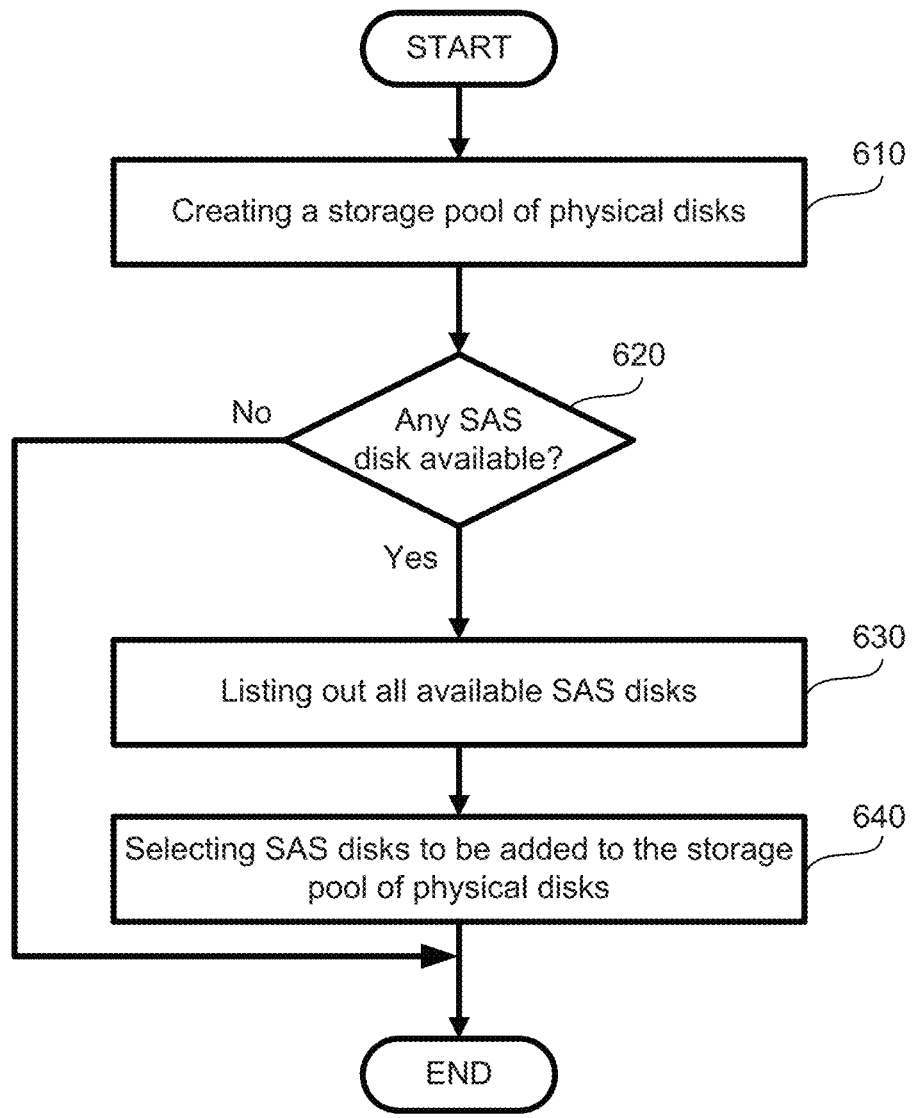
FIG. 6A depicts a flowchart showing configuration of a storage pool of the physical disks according to certain embodiments of the present disclosure.

FIG. 6A depicts a flowchart showing configuration of a storage pool of the physical disks according to certain embodiments of the present disclosure. In this embodiment, the physical disks 150 used for implementing the storage pool include SAS disks. In certain embodiments, the physical disks 150 may include other types of hard disks under other storage protocols.

As shown in FIG. 6A, at procedure 610, the SVM starts creating a storage pool of the physical disks 150. At procedure 620, the SVM detects if any SAS disk is available in the system 100. If there is at least one SAS disk available, the SVM moves to procedure 630. If no SAS disk is available in the system, the SVM does nothing. In certain embodiments, the detection at procedure 620 may be performed by the SVM monitor engine 179.

At procedure 630, the SVM lists out all available SAS disk in the system 100. At procedure 640, the SVM receives an instruction for selecting the SAS disks to be added to the storage pool of the physical disks 150. In certain embodiments, the listing at procedure 630 and the selection at procedure 640 may be performed by the UI module 175 to allow the user to make the selection from the listing of the SAS disks to be added to the storage pool. Once the selection of the SAS disks is received, the SVM may create the storage pool based on the selection.

Figure 6B:
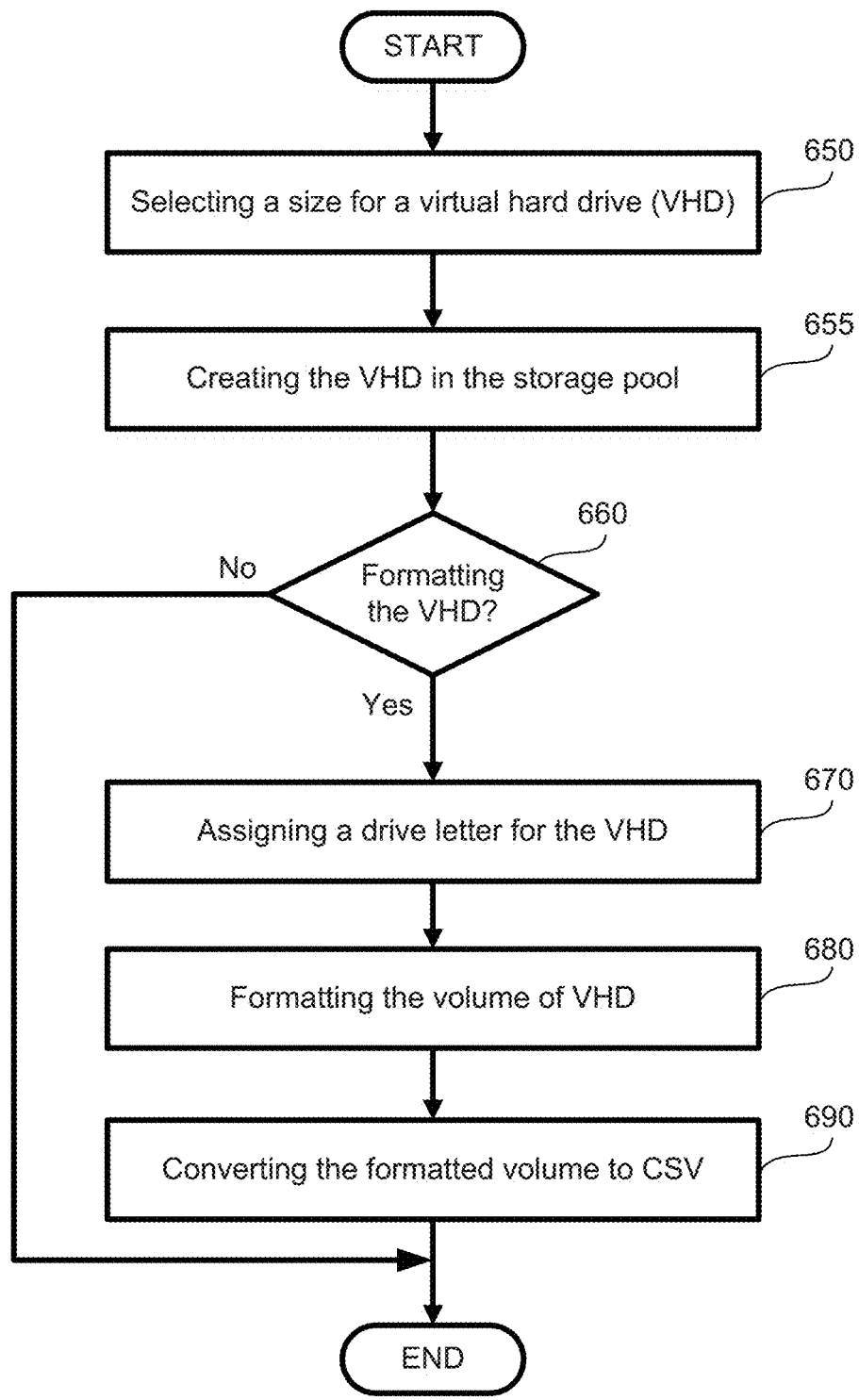
FIG. 6B depicts a flowchart showing configuration of the CSV according to certain embodiments of the present disclosure.

FIG. 6B depicts a flowchart showing configuration of the CSV according to certain embodiments of the present disclosure. In this embodiment, the configuration of the CSV is performed by the configuration module 176 at procedure 360 as shown in FIG. 3. In certain embodiments, the configuration of the CSV is performed after the configuration of the storage pool as shown in FIG. 6A.

At procedure 650, the configuration module 176 selects a size for a virtual hard drive (VHD). At procedure 655, the configuration module 176 creates the VHD in the storage pool based on the selection made at procedure 650. Optionally, at procedure 660, the configuration module 176 may receive an instruction to determine whether the VHD requires formatting. In certain embodiments, the selection at procedure 660 may be performed by the UI module 175 to allow the user to make the selection as to whether formatting of the VHD is to be performed. If formatting is selected, the configuration module 176 moves to procedure 670. If formatting is not selected, the configuration module 176 does nothing.

At procedure 670, the configuration module 176 assigns a drive letter for the VHD. In certain embodiments, the drive letter may be provided by the user in the selection at procedure 660. At procedure 680, the configuration module 176 performs formatting of the volume of the VHD. At procedure 690, the configuration module 176 converts the formatted volume of the VHD to the CSV 152. Thus, the configuration of the CSV 152 is complete.

In a further aspect, the present disclosure is related to a non-transitory computer readable medium storing computer executable code. The code, when executed at one or more processor, may perform the method as described above. In certain embodiments, the non-transitory computer readable medium may include, but not limited to, any physical or virtual storage media. In certain embodiments, the non-transitory computer readable medium may be implemented as the non-volatile memory 126 of the virtual desktop controller 120 as shown in FIG. 2.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A system for performing efficient failover and virtual machine (VM) migration in virtual desktop infrastructure (VDI), comprising:
   a plurality of computing devices; and
   a virtual desktop controller communicatively connected to the computing devices via a network, wherein the virtual desktop controller comprises a processor, a memory, and a storage device storing computer executable code, wherein the code, when executed at the processor, is configured to
      configure a failover cluster of the system, wherein the failover cluster comprises the computing devices, and for each of the computing devices, a random access memory (RAM) disk is launched on a volatile memory array using a RAM disk driver;
      configure an active node of the failover cluster by assigning one of the computing devices of the failover duster as the active node;
      configure at least one passive node of the failover cluster by assigning each of the other of the computing devices of the failover cluster as the passive node and a first backup node of the active node;

configure a clustered shared volume (CSV) of physical
    disks as a second backup node of the active node;
monitor the computing devices of the failover cluster;
control the active node to copy information stored in
    the active node to the passive node and the CSV, such
    that the information stored in the active node is
    identical to backup information stored in the passive
    node and the CSV by controlling the RAM disk
    driver at the active node to:
  in response to writing data to the RAM disk of the
    active node, write the data to the RAM disk of the
    passive node in a write-through mode; and
  write the data to the CSV in a write-slow mode; and
when the active node of the failover cluster fails,
    configure a new active node for the failover cluster
    by assigning one of the passive node of the failover
    cluster as the new active node with no or minimal
    down time of the system.

2. The system as claimed in claim 1, wherein each of the computing devices assigned as the passive node comprises identical hardware and software components to the computing device being assigned as the active node.

3. The system as claimed in claim 1, wherein each of the computing devices of the failover cluster is a virtual machine server storing the hypervisor and the plurality of VMs, wherein the virtual desktop controller is connected to the virtual machine server through an interface.

4. The system as claimed in claim 3, wherein the code, when executed at the processor, is further configured to:
  control the virtual machine server being assigned as the active node to execute the hypervisor and to execute the VMs on the executed hypervisor.

5. The system as claimed in claim 4, wherein the code, when executed at the processor, is further configured to:
  when the failed active node of the failover cluster recovers, configure the recovered active node as a new passive node for the failover cluster with no or minimal down time of the system.

6. The system as claimed in claim 5, wherein the code comprises a snap VDI manager (SVM), the SVM comprising:
  a data store storing information of the system, wherein the information of the system comprises cluster configuration information for the failover cluster;
  a VM control module configured to control the virtual machine server being assigned as the active node to execute the hypervisor and to execute the VMs on the executed hypervisor;
  a backup module configured to control the active node to copy the information stored in the active node to the passive node and the CSV;
  a SVM monitor engine configured to monitor the computing devices of the failover cluster and generate corresponding monitoring information, and to determine whether each of the computing devices fails or recovers based on the monitoring information; and
  a configuration module configured to:
    configure the failover cluster of the system based on the cluster configuration information,
    configure the active node,
    configure the passive node,
    configure the CSV,
    when the SVM monitor engine determines based on the monitoring information that the active node of the failover cluster fails, configure the new active node for the failover cluster by assigning one of the passive nodes of the failover cluster as the new active node with no or minimal down time of the system, and
    when the SVM monitor engine determines based on the monitoring information that the failed active node of the failover cluster recovers, configure the recovered active node as the new passive node for the failover cluster with no or minimal down time of the system.

7. The system as claimed in claim 6, wherein the SVM further comprises:
  a user interface module for displaying the monitoring information on a display device.

8. The system as claimed in claim 6, wherein the configuration module is configured to configure the failover cluster of the system based on the cluster configuration information by:
  adding each of the computing devices into the failover cluster based on the cluster configuration information;
  configuring each of the computing devices; and
  for each of the computing devices,
    launching the RAM disk on the volatile memory array using the RAM disk driver;
    deploying the VMs to the RAM disk; and
    executing the VMs from the RAM disk.

9. The system as claimed in claim 8, wherein the SVM monitor engine is configured to monitor the computing devices of the failover cluster by:
  monitoring hardware components of each of the computing devices; and
  monitoring the RAM disk of each of the computing devices.

10. A method for performing efficient failover and virtual machine (VM) migration in virtual desktop infrastructure (VDI), comprising:
  configuring, by a snap VDI manager (SVM) executed at a processor of a virtual desktop controller, a failover cluster of a VDI system, wherein the failover cluster comprises a plurality of computing devices of the VDI system, wherein the virtual desktop controller is communicatively connected to the computing devices via a network, and for each of the computing devices, a random access memory (RAM) disk is launched on a volatile memory array using a RAM disk driver;
  configuring, by the executed SVM, an active node of the failover cluster by assigning one of the computing devices of the failover cluster as the active node;
  configuring, by the executed SVM, at least one passive node of the failover cluster by assigning each of the other of the computing devices of the failover cluster as the passive node and a first backup node of the active node;
  configuring, by the executed SVM, a clustered shared volume (CSV) of physical disks as a second backup node of the active node;
  monitoring, by the executed SVM, the computing devices of the failover cluster;
  controlling, by the executed SVM, the active node to copy information stored in the active node to the passive node and the CSV, such that the information stored in the active node is identical to backup information stored in the passive node and the CSV by controlling the RAM disk driver at the active node to:
    in response to writing data to the RAM disk of the active node, write the data to the RAM disk of the passive node in a write-through mode; and
    write the data to the CSV in a write-slow mode; and when the active node of the failover cluster fails, configuring, by the executed SVM, a new active node for the failover cluster by assigning one of the passive nodes of the failover cluster as the new active node with no or minimal down time of the VDI system.

11. The method as claimed in claim 10, wherein each of the computing devices assigned as the passive node comprises identical hardware and software components to the computing device being assigned as the active node.

12. The method as claimed in claim 10, wherein each of the computing devices of the failover cluster is a virtual machine server storing the hypervisor and the plurality of VMs, wherein the virtual desktop controller is connected to the virtual machine server through an interface.

13. The method as claimed in claim 12, further comprising:
controlling, by the executed SVM, the virtual machine server being assigned as the active node to execute the hypervisor and to execute the VMs on the executed hypervisor; and
when the failed active node of the failover cluster recovers, configuring, by the executed SVM, the recovered active node as a new passive node for the failover cluster with no or minimal down time of the VDI system.

14. The method as claimed in claim 13, wherein the SVM comprises:
a data store storing information of the VDI system, wherein the information of the VDI system comprises cluster configuration information for the failover cluster;
a VM control module configured to control the virtual machine server being assigned as the active node to execute the hypervisor and to execute the VMs on the executed hypervisor;
a backup module configured to control the active node to copy the information stored in the active node to the passive node and the CSV;
a SVM monitor engine configured to monitor the computing devices of the failover cluster and generate corresponding monitoring information, and to determine whether each of the computing devices fails or recovers based on the monitoring information;
a user interface module for displaying the monitoring information on a display device; and
a configuration module configured to:
configure the failover cluster of the VDI system based on the cluster configuration information,
configure the active node,
configure the passive node,
configure the CSV,
when the SVM monitor engine determines based on the monitoring information that the active node of the failover cluster fails, configure the new active node for the failover cluster by assigning one of the passive nodes of the failover cluster as the new active node with no or minimal down time of the VDI system, and
when the SVM monitor engine determines based on the monitoring information that the failed active node of the failover cluster recovers, configure the recovered active node as a new passive node for the failover cluster with no or minimal down time of the VDI system.

15. The method as claimed in claim 14, wherein the configuration module is configured to configure the failover cluster of the VDI system based on the cluster configuration information by:
adding each of the computing devices into the failover cluster based on the cluster configuration information;
configuring each of the computing devices; and
for each of the computing devices,
launching the RAM disk on the volatile memory array using the RAM disk driver;
deploying the VMs to the RAM disk; and
executing the VMs from the RAM disk.

16. The method as claimed in claim 15, wherein the SVM monitor engine is configured to monitor the computing devices of the failover cluster by:
monitoring hardware components of each of the computing devices; and
monitoring the RAM disk of each of the computing devices.

17. A non-transitory computer readable medium storing computer executable code, wherein the code, when executed at a processor of a virtual desktop controller, is configured to:
configure a failover cluster of a virtual desktop infrastructure (VDI) system, wherein the failover cluster comprises a plurality of computing devices of the VDI system, wherein the virtual desktop controller is communicatively connected to the computing devices via a network, and for each of the computing devices, a random access memory (RAM) disk is launched on a volatile memory array using a RAM disk driver;
configure an active node of the failover cluster by assigning one of the computing devices of the failover cluster as the active node;
configure at least one passive node of the failover cluster by assigning each of the other computing devices of the failover cluster as the passive node and a first backup node of the active node;
configure a clustered shared volume (CSV) of physical disks as a second backup node of the active node;
monitor the computing devices of the failover cluster;
control the active node to copy information stored in the active node to the passive node and the CSV, such that the information stored in the active node is identical to backup information stored in the passive node and the CSV by controlling the RAM disk driver at the active node to:
in response to writing data to the RAM disk of the active node, write the data to the RAM disk of the passive node in a write-through mode; and
write the data to the CSV in a write-slow mode; and
when the active node of the failover cluster fails, configure a new active node for the failover cluster by assigning one of the passive nodes of the failover cluster as the new active node with no or minimal down time of the VDI system.

18. The non-transitory computer readable medium as claimed in claim 17, wherein each of the computing devices assigned as the passive node comprises identical hardware and software components to the computing device being assigned as the active node.

19. The non-transitory computer readable medium as claimed in claim 17, wherein each of the computing devices of the failover cluster is a virtual machine server storing the hypervisor and the plurality of VMs, wherein the virtual desktop controller is connected to the virtual machine server through an interface.

20. The non-transitory computer readable medium as claimed in claim 17, wherein the code, when executed at a processor of a virtual desktop controller, is further configured to:
control the virtual machine server being assigned as the active node to execute the hypervisor and to execute the VMs on the executed hypervisor; and
when the failed active node of the failover cluster recovers, configure the recovered active node as a new passive node for the failover cluster with no or minimal down time of the VDI system.

21. The non-transitory computer readable medium as claimed in claim 20, wherein the code comprises:
a data store storing information of the system, wherein the information of the system comprises cluster configuration information for the failover cluster;
a VM control module configured to control the virtual machine server being assigned as the active node to execute the hypervisor and to execute the VMs on the executed hypervisor;
a backup module configured to control the active node to copy the information stored in the active node to the passive node and the CSV;
a snap VDI manager (SVM) monitor engine configured to monitor the computing devices of the failover cluster and generate corresponding monitoring information, and to determine whether each of the computing devices fails or recovers based on the monitoring information;
a user interface module for displaying the monitoring information on a display device; and
a configuration module configured to:
configure the failover cluster of the system based on the cluster configuration information,
configure the active node,
configure the passive node,
configure the CSV,
when the SVM monitor engine determines based on the monitoring information that the active node of the failover cluster fails, configure the new active node for the failover cluster by assigning one of the passive nodes of the failover cluster as the new active node with no or minimal down time of the VDI system, and
when the SVM monitor engine determines based on the monitoring information that the failed active node of the failover cluster recovers, configure the recovered active node as a new passive node for the failover cluster with no or minimal down time of the VDI system.

22. The non-transitory computer readable medium as claimed in claim 21, wherein the configuration module is configured to configure the failover cluster of the system based on the cluster configuration information by:
adding each of the computing devices into the failover cluster based on the cluster configuration information;
configuring each of the computing devices; and
for each of the computing devices,
launching the RAM disk on the volatile memory array using the RAM disk driver;
deploying the VMs to the RAM disk; and
executing the VMs from the RAM disk.

23. The non-transitory computer readable medium as claimed in claim 22, wherein the SVM monitor engine is configured to monitor the computing devices of the failover cluster by:
monitoring hardware components of each of the computing devices; and
monitoring the RAM disk of each of the computing devices.

* * * * *